(12) United States Patent
Rudland et al.

(10) Patent No.: US 9,335,399 B2
(45) Date of Patent: May 10, 2016

(54) LOCATION DETECTION SYSTEM AND METHOD WITH FINGERPRINTING

(75) Inventors: Philip Andrew Rudland, Sunderland (GB); Peter Stephen May, Maidstone (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/258,597

(22) PCT Filed: Mar. 9, 2010

(86) PCT No.: PCT/IB2010/051010
§ 371 (c)(1),
(2), (4) Date: Sep. 22, 2011

(87) PCT Pub. No.: WO2010/109361
PCT Pub. Date: Sep. 30, 2010

(65) Prior Publication Data
US 2012/0021768 A1    Jan. 26, 2012

Related U.S. Application Data

(60) Provisional application No. 61/162,485, filed on Mar. 23, 2009.

(51) Int. Cl.
*H04W 24/00* (2009.01)
*G01S 5/02* (2010.01)
*G06N 3/12* (2006.01)

(52) U.S. Cl.
CPC .............. *G01S 5/0252* (2013.01); *G06N 3/126* (2013.01)

(58) Field of Classification Search
CPC ....... H04W 64/00; H04W 4/02; H04W 4/028; H04W 16/20; H04W 4/023; H04W 8/005; G01S 5/0252; G01S 5/14; G01S 5/0242
USPC .......................................... 455/456.1, 67.11
See application file for complete search history.

(56) References Cited

U.S. PATENT DOCUMENTS 5,977,913 A    11/1999  Christ
7,966,021 B2 *  6/2011  Dietrich et al. ............ 455/456.1
(Continued)

FOREIGN PATENT DOCUMENTS

| EP | 1795912 A1 | 6/2007 |
| JP | 10094040 A | 4/1998 |
| JP | 2008148136 A | 6/2008 |

OTHER PUBLICATIONS

Robinson et al., "Received signal strength based location estimation of a wireless LAN client", Wireless communications and networking conference, 2005.

*Primary Examiner* — Liton Miah

(57) ABSTRACT

A location detection system and method with fingerprinting including defining nodes in an area, the area being associated with field devices and a target device; determining expected signal strengths from the field devices at the nodes; measuring actual signal strengths from the field devices at the target device for each of the field devices in communication with the target device; designating as valid nodes the nodes having the expected signal strength for a particular field device that is greater than or equal to the actual signal strength for a particular field device; and determining at least one of the valid nodes for which the actual signal strengths for the field devices agree with the expected signal strengths for the field devices at the at least one of the valid nodes.

20 Claims, 3 Drawing Sheets

(56) References Cited

U.S. PATENT DOCUMENTS

| | | |
|---|---|---|
| 2001/0022558 A1 | 9/2001 | Karr, Jr. et al. |
| 2003/0146871 A1 | 8/2003 | Karr et al. |
| 2003/0220116 A1* | 11/2003 | Sagefalk et al. ............ 455/456.1 |
| 2004/0152470 A1* | 8/2004 | Spain ......................... 455/456.1 |
| 2004/0166877 A1 | 8/2004 | Spain, Jr. et al. |
| 2004/0180671 A1* | 9/2004 | Spain, Jr. .................... 455/456.1 |
| 2005/0014518 A1 | 1/2005 | Spain, Jr. et al. |
| 2005/0046608 A1 | 3/2005 | Schantz et al. |
| 2005/0261004 A1 | 11/2005 | Dietrich et al. |
| 2006/0267833 A1 | 11/2006 | Langford et al. |
| 2007/0021126 A1 | 1/2007 | Nanda |
| 2009/0326810 A1* | 12/2009 | Callaghan et al. ............ 701/208 |

* cited by examiner

LOCATION DETECTION SYSTEM AND METHOD WITH FINGERPRINTING

BACKGROUND

The technical field of this disclosure is location detection systems and methods, particularly, location detection systems and methods with fingerprinting.

Wireless communication and control networks are becoming increasingly popular for home automation, building automation, healthcare infrastructure, low power cable-less links, asset control, and other applications. One benefit of such networks is the ability to locate a network device or tag. For example, lighting commissioning personnel can quickly identify a specific wireless device, so installation costs can be reduced. Expensive equipment may be tagged, and tracked in and around a building, allowing staff to easily locate the tagged equipment when needed for use, in an emergency, or for calibration. Tagged equipment can also generate an alarm when moved beyond specified boundaries. One example of such a wireless communication and control network is a ZigBee network, which is a low cost, low power, wireless standard using the ZigBee protocol operating on top of the IEEE 802.15.4 wireless standard.

Although wireless devices can be located by estimating the distance from a number of fixed points and triangulating the location from the distance estimates, the accuracy of the location depends on the accuracy of the distance estimates. Two methods of estimating distance are time of flight and signal strength. The distance for a time of flight distance estimate is computed from the time for a signal to pass from one point to another and the expected signal velocity. The distance for a signal strength distance estimate is computed from the decrease in signal strength and the expected signal strength decay. Unfortunately, the bandwidth of some wireless communication and control networks is too narrow to make a time of flight distance estimate. In addition, the signal strength of some wireless communication and control networks varies widely with position due to attenuation and reflection from objects such as walls and people, typically preventing either a time of flight distance estimate or a signal strength distance estimate.

Another approach to location detection has been fingerprinting. Signal strengths are measured over the area of the wireless communication and control network to determine a set of fingerprints for the area, i.e., a map of signal strengths from nearby devices for any location within the area. A device to be located measures the signal strength from the devices at known locations around it. The measured signal strengths are compared to the set of fingerprints to determine the location of the device. Unfortunately, determining the set of fingerprints of the area is time and labor intensive, making the process expensive. Also, the comparison between the measured signal strengths and the set of fingerprints requires comparison over the whole set of fingerprints, requiring a great deal of computational effort and time.

It would be desirable to have a location detection system and method with fingerprinting that would overcome the above disadvantages.

SUMMARY OF THE INVENTION

One aspect of the present invention focuses on a location detection method including defining nodes in an area, the area being associated with field devices and a target device; determining expected signal strengths from the field devices at the nodes, each expected signal strength at a particular node being associated with one of the field devices; measuring actual signal strengths from the field devices at the target device for each of the field devices in communication with the target device, each actual signal strength being associated with one of the field devices; designating as valid nodes the nodes having the expected signal strength for a particular field device that is greater than or equal to the actual signal strength for a particular field device; and determining at least one of the valid nodes for which the actual signal strengths for the field devices agree with the expected signal strengths for the field devices at the one of the valid nodes.

Another aspect of the present invention focuses on a location detection system including a target device; field devices; and a processor. The processor is operable to determine expected signal strengths from the field devices at nodes in an area, each expected signal strength at a particular node being associated with one of the field devices; measure actual signal strengths from the field devices at the target device for each of the field devices in communication with the target device, each actual signal strength being associated with one of the field devices; designate as valid nodes the nodes having the expected signal strength for a particular field device that is greater than or equal to the actual signal strength for a particular field device; and determine at least one of the valid nodes for which the actual signal strengths for the field devices agree with the expected signal strengths for the field devices at the one of the valid nodes.

Yet another aspect of the present invention focuses on a location detection method including defining nodes in an area, the area being associated with a target device and field devices; determining expected signal strengths from the target device at the field devices, each expected signal strength at a particular field device being associated with one of the nodes; measuring actual signal strengths from the target device at the field device for each of the field devices in communication with the target device, each actual signal strength being associated with one of the field devices; designating as valid nodes the nodes having the expected signal strength for the particular field device that is greater than or equal to the actual signal strength for the particular field device; and determining at least one of the valid nodes for which the actual signal strengths for the field devices agree with the expected signal strengths for the field devices at the one of the valid nodes.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
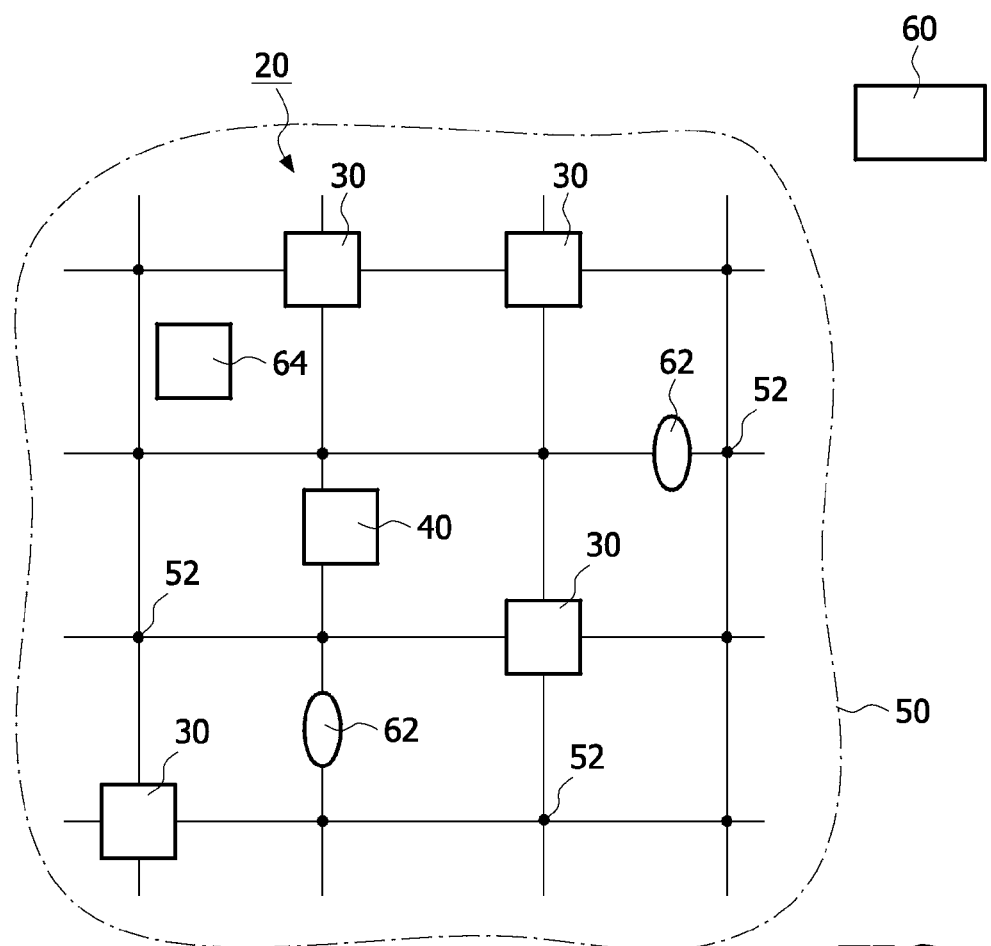
FIG. 1 is a schematic diagram of a location detection system in accordance with the present invention.

FIG. 1 is a schematic diagram of a location detection system in accordance with various embodiments of the present invention. A number of field devices associated with an area are used to locate a target device in the area.

Referring to FIG. 1, in some embodiments, the location detection system 20 includes a number of field devices 30 and at least one target device 40. The field devices 30 are associated with an area 50 that includes a number of nodes 52. The field devices 30 are at known positions relative to the area 50. The target device 40 is at an unknown position relative to the area 50 and is the device for which location is to be determined The field devices 30 can be in communication with each other and with the target device 40. The field devices 30 and/or the target device 40 can also be in communication with an optional control unit 60, which is in or out of the area 50. In another embodiment, the optional control unit 60 can be included in one of the field devices 30 or the target device 40. Obstructions 62 in or out of the area 50 can attenuate and/or reflect signals between the target device 40 and the field devices 30, changing the signal strength at the nodes 52 from the signal strength that would occur were the obstructions 62 not present. Exemplary obstructions include walls, people, furniture, and the like. The location detection system 20 can also include an optional sensing device 64, such as a mobile location sensor for measuring an actual node location or a device for measuring an actual secondary location parameter, such as WiFi signal strength, temperature, electrical noise, light level, sound level, and the like. The optional sensing device 64 can be used to provide feedback as to the accuracy of the location detection or can be used to provide additional input to the modeling of the field devices and their surroundings in the area.

The area 50 can be any area associated with a number of field devices 30, which can be in or out of the area 50 and on or off the nodes 52. The nodes 52 in the area 50 can be defined in any pattern desired for a particular application. In this example, the nodes 52 are arranged in a Cartesian grid. The nodes 52 can be defined in two or three dimensions with spacing as required by the desired accuracy in locating the target device 40 and as allowed by the computational resources available.

The field devices 30 communicate wirelessly with the target device 40. The field devices 30 and the target device 40 can communicate using any desired protocol, such as a ZigBee protocol operating on top of the IEEE 802.15.4 wireless standard, WiFi protocol under IEEE standard 802.11 (such as 802.11b/g/n), Bluetooth protocol, Bluetooth Low Energy protocol, or the like. ZigBee protocol systems typically have a large number of field devices at fixed reference points, especially if the lighting infrastructure uses ZigBee protocol for wireless control. The field devices 30 can be fixed or moveable, as long as the position of the field devices 30 is known when locating the target device 40. In one embodiment, the location of at least one field device can be estimated from a known position of a fixed field device. Thus, the location of all the field devices is not required when beginning the location detection.

Figure 2:
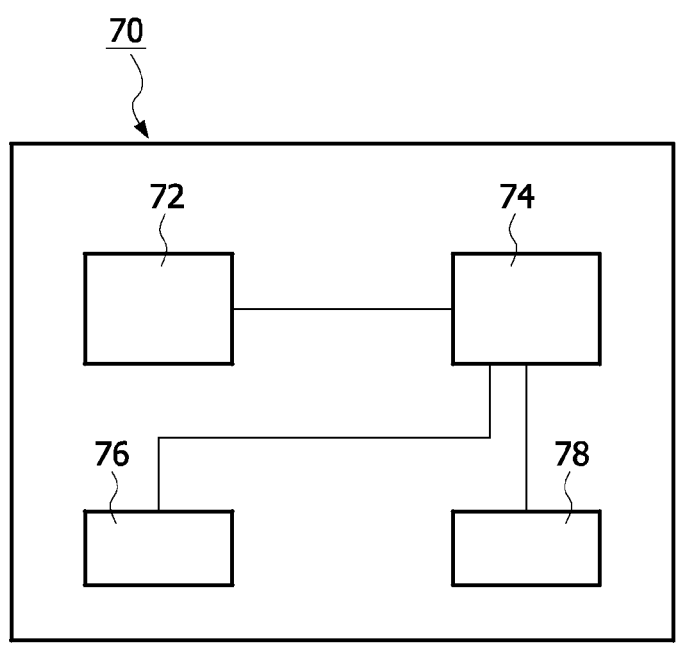
FIG. 2 is a block diagram of a wireless device for use with a location detection system and method in accordance with the present invention.

FIG. 2 is a block diagram of a wireless device for use with a location detection system and method in accordance with various embodiments of the present invention. The wireless device can be a field device or a target device. In this example, the wireless device can be a transmitter, a receiver, or a transmitter and receiver, and can be moveable or fixed.

Referring to FIG. 2, in some embodiments, the wireless device 70 includes memory storage 72, a processor 74, a transmitter portion 76, and a receiver portion 78. The memory storage 72 can be any memory storage suitable for storing data and/or instructions. The memory storage 72 exchanges information with the processor 74, which controls operation of the wireless device 70. The transmitter portion 76 and receiver portion 78 communicate wirelessly with other wireless devices and/or central control centers, and can include antennas. The transmitter portion 76 can receive data and instructions from the processor 74, and transmit a signal from the wireless device 70. The receiver portion 78 can receive a signal from outside the wireless device 70, and provide data and instructions to the processor 74.

The wireless device 70 can operate as a transmitter, a receiver, or a transmitter and receiver. In one embodiment, the transmitter portion 76 can be omitted and the wireless device 70 operated as a receiver. In another embodiment, the receiver portion 78 can be omitted and the wireless device 70 operated as a transmitter. In one embodiment, the wireless device 70 operates under the ZigBee communications protocol operating on top of the IEEE 802.15.4 wireless standard. In other embodiments, the wireless device 70 operates under the WiFi protocol under IEEE standard 802.11 (such as 802.11b/g/n), Bluetooth protocol, Bluetooth Low Energy protocol, or the like. Those skilled in the art will appreciate that the wireless device 70 can operate under any wireless protocol desired for a particular application. The wireless device can be associated with another object, such as a lighting fixture, lighting control unit, asset to be tracked, a medical patient, or any other object. The wireless device can also control and/or monitor the associated object.

The wireless device 70 can send and receive signals at a single carrier frequency or at a number of carrier frequencies. Wave length changes with carrier frequency, so the sensitivity to obstructions and interaction between signals from different field devices, such as null points, change with different carrier frequencies. In one embodiment, the processor 74 can switch operation of the wireless device 70 between different carrier frequencies.

Those skilled in the art will appreciate that the processor 74 can be a number of processors located with the wireless device 70 or at another location as required for computing power and ease of data communication. In one embodiment, the processor includes processors at each wireless device and a central processor at the optional control unit in communication with the wireless devices.

Figure 3:
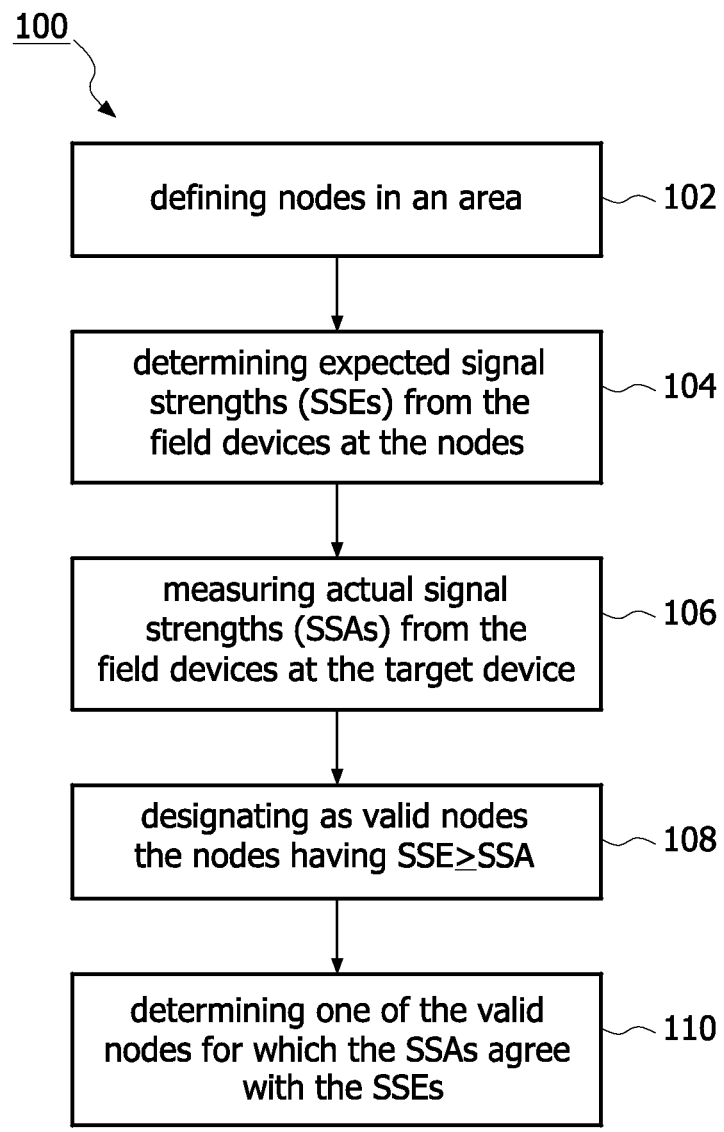
FIG. 3 is a flowchart of a location detection method in accordance with the present invention.

FIG. 3 is a flowchart of a location detection method in accordance with some embodiments of the present invention. The method 100 includes defining nodes in an area 102, the area being associated with field devices and a target device; determining expected signal strengths from the field devices at the nodes 104, each expected signal strength at a particular node being associated with one of the field devices; measuring actual signal strengths from the field devices at the target device 106 for each of the field devices in communication with the target device, each actual signal strength being associated with one of the field devices; designating as valid nodes the nodes having the expected signal strength for a particular field device that is greater than or equal to the actual signal strength for a particular field device 108; and determining at least one of the valid nodes for which the actual signal strengths for the field devices agree with the expected signal strengths for the field devices at the at least one of the valid nodes 110. The method 100 can be carried out with a location detection system as described in FIGS. 1 & 2 above. Computational operations can be carried out at the processor in the wireless device, distributed processors, a processor in an optional control unit, and/or a remote processor.

Referring to FIG. 3, the defining nodes in an area 102, the area being associated with field devices and a target device, establishes the area in which the target device can be located. The field devices can be outside the area as long as the radio frequency signals which they generate are in the area or radio frequency signals which they receive originate from the area. The field devices can be fixed or moveable, but are at known positions relative to the area. In one embodiment, the field devices generate radio frequency signals, some or all of which are received by the target device. In another embodiment, the target device generates radio frequency signals, which are received by some or all of the field devices.

Determining expected signal strengths (SSEs) from the field devices at the nodes 104, each expected signal strength at a particular node being associated with one of the field devices, determines a set of fingerprints for the area, i.e., a map of signal strengths from the field devices or target device for any location within the area. The expected signal strengths can be determined by various methods of modeling the field devices and their surroundings in the area.

One example of modeling to determine the expected signal strengths creates a record array (or multidimensional array) of expected signal strengths at the nodes, such as the two dimensional case with one record for each x-y node on a uniform Cartesian grid representing the area of interest. Each record for a field device node, which corresponds to a field device originating a signal, can include data such as: the identity of the field device node (Node A; Node B; . . . ; Node X), the coordinates for the field device node (Ax, Ay; Bx, By; . . . ; Xx, Xy), the signal level for the field device node (SignalLevelAtA; SignalLevelAtB; . . . ; SignalLevelAtX), and any other data for the field device node as desired for a particular application. The data can be entered through a hard-coded program by automatic deduction or manually through some other user interface.

An expected signal strength for each node in the area from each field device can be calculated from the records for the field device nodes. An expected signal record can be constructed for each node x,y in the grid (at coordinates x,y) with record RecordContents (x,y) equal to {signalLevelFromNodeA; signalLevelFromNodeB; . . . ; signalLevelFromNodeX}, including signal levels at the node from each of the field device nodes. The signal levels values can be determined by calculating the distance from the field device node to the node and estimating the decrease in signal strength at that distance. For example, the distance from the field device node A (Ax, Ay) to the node (x,y) equals the square root of $[(Ax-x)^2+(Ay-y)^2]$. The signal levels value SignalLevelFromNodeA at the node x,y equals the SignalLevelAtA * fn(distance of node x,y from field device node A), where the function fn(x) returns an estimate of the remaining signal strength at distance x from the source. In one embodiment for a typical 2.4 GHz point transmitter, the function fn(x) equals $(x^{-3.5})$. The calculation is performed for each node in the area for each field device node, populating the records RecordContents (x,y) for all nodes x,y in the area.

In one embodiment, the expected signal strengths can be held in a table. In another embodiment that saves table space and computational effort, particularly when computations are to be performed for a large number of nodes, the computation of the expected signal strengths can be combined with calculation of the FNerror function for a node.

Those skilled in the art will appreciate that determining the expected signal strengths (SSEs) at the nodes 104, i.e., the modeling of the set of fingerprints for the area, can be performed by a number of methods and can be adapted as required for a particular application. In determining expected signal strengths (SSEs) from the field devices at the nodes 104, the determination can use modeling factors to provide more accuracy for the expected signal strengths (SSEs) at the nodes. Exemplary modeling factors include signal propagation, signal propagation with predicted uncertainty, known obstructions, potential obstruction probabilities, air humidity, and the like. In one embodiment, the signal propagation, i.e., the radiation pattern from the field devices, can be modeled using a method such as ray tracing. This can include correction for certain antenna types which have stronger signals or nulls in certain directions. The signal propagation can optionally account for predicted uncertainty in the radiation pattern. In another embodiment, a more complex and accurate model of the decay of the radiation pattern with distance, rather than fn(x) equals $(x^{-3.5})$, can be used. In another embodiment, the decay of the radiation pattern with distance can be modeled as fn(x) equals $(x^{-2.5})$, as appropriate for certain indoor environments. In another embodiment, known obstructions within the area can be modeled to account for reflection and/or attenuation of the signals. A user interface can be used to input the location and nature of known obstructions. In another embodiment, traffic patterns can be modeled as potential obstruction probabilities to account for the likelihood of people and/or objects being in the area and changing the signal strength. In another embodiment, expected air humidity can be can be modeled to account for attenuation of the signals. A user interface or other automated sensor input can be included to input humidity throughout the area and/or in particular regions of the area.

In determining expected signal strengths, the method 100 can account for field devices being offline by detecting when at least one field device is offline, and determining expected signal strengths accounting for the at least one offline field device. An offline field device no longer generates a signal, so the expected signal strengths calculated initially for the set of fingerprints are no longer representative of the expected signal strengths in the area. The target device will see no signal from the offline field device and interpret the signal strength as indicating the particular field device is far away, resulting in poor target device location detection. In one embodiment, a user interface can be included to input any field devices that are offline. The function FNerror used in determining at least one of the valid nodes for which the actual signal strengths closely agree with the expected signal strengths can then disregard terms for the offline field devices.

Measuring actual signal strengths (SSAs) from the field devices at the target device for each of the field devices in communication with the target device 106, each actual signal strength being associated with one of the field devices, obtains information for comparison to the expected signal strengths (SSEs). A target device record can be constructed of the actual signal strengths with record MeasuredRecord equal to {signalLevelFromNodeA; signalLevelFromNodeB; . . . ; signalLevelFromNodeX} including signal levels received at the target device from each of the field device nodes.

Designating as valid nodes the nodes having the expected signal strength (SSE) for a particular field device that is greater than or equal to the actual signal strength (SSA) for a particular field device 108 accounts for the physical behavior of the signals. Other than reflections and freak conditions, a valid reading for the actual signal strength for a particular field device at a particular node is less than or approximately equal to the expected signal strength. That is, the signal is much more likely to be attenuated or absorbed compared to the physical model, than the signal is likely to be increased. When actual signal strength suggests that a target device is ten meters away from a particular field device, the target device and particular field device are probably ten meters apart if the path between them is unobstructed and not faded, or somewhat nearer than ten meters apart if the path is obstructed or faded: it is unlikely that the target device and particular field device are further apart. Thus, nodes having an actual signal strength for a particular field device that is greater than the expected signal strength can be ignored as invalid nodes and the valid nodes alone used in locating the target device. Those skilled in the art will appreciate that equal as defined herein includes approximately equal, so that a valid node with an expected signal strength greater than or equal to the actual signal strength can include a node with the actual signal strength being slightly larger than the expected signal strength, as desired for a particular application.

Determining at least one of the valid nodes for which the actual signal strengths (SSAs) for the field devices agree with the expected signal strengths (SSEs) for the field devices at the at least one of the valid nodes 110 selects the node where the target device is most likely to be located, i.e., where the fingerprint of the expected signal strengths from the field devices matches the actual signal strengths detected at the target device. Agreement is defined herein as occurring when the actual signal strengths (SSAs) and the expected signal strengths (SSEs) match in a manner and to a degree appropriate for the determination method. In one embodiment, the actual signal strengths (SSAs) agree with the expected signal strengths (SSEs) when the error between the actual signal strengths (SSAs) and the expected signal strengths (SSEs) is minimized In another embodiment, the actual signal strengths (SSAs) agree with the expected signal strengths (SSEs) when the error between the actual signal strengths (SSAs) and the expected signal strengths (SSEs) is no more than a predetermined error value. In another embodiment, the actual signal strengths (SSAs) agree with the expected signal strengths (SSEs) when the pattern discerned by a viewer of the distribution of the error sums on a visual display for all nodes individually indicates to the viewer the most likely node for the target device. In another embodiment, the actual signal strengths (SSAs) agree with the expected signal strengths (SSEs) when the averaging of node locations for nodes indicates the most likely node for the target device. Those skilled in the art will appreciate that the manner, degree, and determination method can be selected as desired for a particular application.

In one embodiment, the record MeasuredRecord containing the actual signal strengths at the target device can be compared against each of the possible RecordContents (x,y) values including expected signal strengths at each node to find the best fit. In one example, a least-squares method is used, with FNerror defined as a least-squares function which compares two records such that
FNerror [record1, record2] equals the square root of:
[(record1:valueA−record2: valueA)^2+
(record1: valueB−record2:valueBA2+ . . . +
(record1:valueX−record2: valueX)^2].

Comparing RecordContents (x,y) having the expected signal strength for a particular node to MeasuredRecord having the actual signal strength for the target device,
FNerror [RecordContents (x,y), MeasuredRecord] equals the square root of:
[(RecordContents (x,y):signalLevelFromNodeA−MeasuredRecord:signalLevelFromNodeA)^2+(RecordContents (x,y):signalLevelFromNodeB−MeasuredRecord:signalLevelFromNodeB)^2+ . . . +(RecordContents (x,y):signalLevelFromNodeX−MeasuredRecord:signalLevelFromNodeX)^2].

After calculating FNerror for all the (x,y) locations individually, the best estimate of location of the target device is the (x,y) location where FNerror [RecordContents (x,y), MeasuredRecord] is the smallest. In one embodiment, likely or possible nodes where the target device may be located can be presented in a graph and/or list. The probability that the target device is at a given node can be included on the graph or list. In one example, FNerror is presented on a three dimensional graph with node locations on the x,y axes and FNerror as an indication of probability on the z axis.

Those skilled in the art will appreciate that a number of variations and additions are possible for the location detection method described above.

In one embodiment, fluctuation in the actual signal strengths can be used to determine when a moving object, such as a person or other object which interferes with the signals from the field devices, is in the area of the field devices. First actual signal strengths can be measured for the target device for each of the field devices in communication with the target device, with each actual signal strength being associated with one of the field devices. Second actual signal strengths for each of the field devices in communication with the target device can then be measured. The second actual signal strengths can be compared to the first actual signal strengths and a probability that an object is moving in the area determined based on the comparing.

In another embodiment, the expected signal strengths can be weighted for a predictable variation in signal strength when determining at least one of the valid nodes for which the actual signal strengths for the field devices agree with the expected signal strengths for the field devices at the at least one of the valid nodes 110. A statistical method can be used to account for fluctuating signal strength from a fluctuating signal. A set of actual signal strengths (MeasuredRecords) can be recorded at different times and used to assess whether the signals are constant or fluctuating. The maximum actual signal strength measured over time for each particular field device is treated as the best estimate of the actual signal strength and can be determined from the set of actual signal strengths. The maximum actual signal strength can be used in place of a single actual signal strength value in the FNerror function. The likelihood of signal obstruction can be calculated for each of the field devices by dividing the minimum actual signal strength from the set of actual signal strengths for a particular field device by the maximum actual signal strength for the particular field device. The likelihood of signal obstruction can be used to determine when to weight the FNerror function for one of the field devices: an error factor can be applied to the FNerror function to produce a high error number when unexpected conditions are detected. Examples of unexpected conditions include when actual signal strength for a particular field device is much less than the typically expected signal strength, so the particular field device appears to be obstructed when normally unobstructed, or when actual signal strength for a particular field device is much greater than the maximum actual signal strength, so the particular field device appears to be unobstructed when normally obstructed. Thus, the likelihood of signal obstruction enters into the fingerprinting assessment.

In another embodiment, the FNerror function can be weighted to give higher errors when actual signal strength is higher than expected signal strength at a node. In one example, the FNerror function term for the node in which the actual signal strength is higher than expected signal strength can be multiplied by a predetermined penalty factor, such as a factor of five. The weighting is based on the observation that an actual signal strength is generally similar to or less than an expected signal strength predicted by physics for the distance between two nodes, since obstructions absorb the signal. In one example, the nodes having the expected signal strength for a particular field device that is less than the actual signal strength for a particular field device can be designated as high error valid nodes and enter into the determination of at least one of the valid nodes, including the high error valid nodes, for which the actual signal strengths for the field devices agree with the expected signal strengths for the field devices at the at least one of the valid nodes 110. The determining at least one of the valid nodes includes determining at least one of the valid nodes minimizing an error function FNerror comparing the actual signal strengths for the field devices with the expected signal strengths. Error terms for the high error valid nodes are multiplied by a predetermined penalty factor to penalize the high error valid nodes relative to the other valid nodes.

In another embodiment, the location detection method can include additional environmental parameters in determining the location of the target device. The method 100 can include determining an expected secondary location parameter at the nodes; measuring an actual secondary location parameter at the at least one of the valid nodes for which the actual signal strengths agree with the expected signal strengths; and comparing the expected secondary location parameter to the actual secondary location parameter. Secondary location parameters are defined herein as any environmental parameter that can be detected in the area. Exemplary secondary location parameters include WiFi signal strength, temperature, electrical noise, light level, sound level, and the like.

In another embodiment, the location detection method can include feedback as to the correctness of the location determined The method 100 can include determining an expected node location for the at least one of the valid nodes for which the actual signal strengths for the field devices agree with the expected signal strengths for the field devices at the one of the valid nodes; measuring an actual node location of the at least one of the valid nodes for which the actual signal strengths closely agree with the expected signal strengths; and comparing the expected node location to the actual node location. The actual node location can be measured with a mobile device, such as an optional sensing device. In determining expected signal strengths 104, the expected signal strengths can be corrected for any differences discovered from comparing the expected node location to the actual node location.

In another embodiment, the location detection method can employ evolutionary algorithm modeling. The computational load is reduced in evolutionary algorithm modeling by calculating expected signal strengths for a limited number of nodes in the area, rather than all the nodes in the area. Evolutionary algorithms (EAs), such as genetic systems based on genetic algorithms (GAs) or artificial immune systems based on artificial immune system algorithms (AISs), select the most likely locations for the target device and calculate expected signal strengths for nodes around the most likely locations. Therefore, expected signal strengths do not have to be calculated initially for all the nodes in the area and expected signal strengths can be calculated when needed. In one embodiment, the expected signal strengths are stored for future use when calculated to avoid recalculation when needed for future use.

Evolutionary algorithms depend on determining how well an individual, i.e., an individual potential solution to a problem, solves that problem. The measure of this quality is called the fitness of the individual. Individuals of high fitness are more likely to contribute to the development of the subsequent populations of individuals which are tested as solutions to the problem. For the problem of location detection, fitness can be determined by the FNerror function with high fitness individuals being those that minimize the difference in signal strengths between the actual and expected signal strengths.

Evolutionary algorithms are optimization algorithms for solving problems and generally follow a high level algorithm including 1) generating a random population of individuals which are potential solutions to the problem; 2) evaluating the fitness of each individual, i.e., determining how well each individual solves the problem; 3) evolving a new population of individuals which are potential solutions to the problem in light of the evaluated fitness; and 4) repeating the evaluating and the evolving until termination when a stopping criterion, such as the number of iterations or a predetermined fitness value, is met.

The evolutionary algorithms can be applied to the location detection method 100. In determining expected signal strengths 104, the expected signal strengths from the field devices at the nodes are determined for an initial population of nodes selected at random. Determining at least one of the valid nodes 110 includes testing fitness of the initial population; evolving at least one additional population of nodes from the initial population based on the fitness; testing fitness of the at least one additional population; and determining at least one of the valid nodes as location of the target device based on a criteria selected from the group consisting of a predetermined fitness value and a predetermined number of iterations. The evolving at least one additional population can include evolving at least one additional population with a system selected from genetic systems and artificial immune systems, i.e., applying genetic systems based on genetic algorithms or artificial immune systems based on artificial immune system algorithms.

For the problem of location detection, the random population of a predetermined number of individuals is a set of randomly selected nodes (x,y) in the area. The target device may be located on or near one of the nodes, although the likelihood is random due to the random selection. Fitness is evaluated by calculating or looking up the expected signal strength for each individual (RecordContents (x,y)) and comparing the expected signal strength to the actual signal strength measured at the target device (MeasuredRecord) using the FNerror function. High fitness individuals, which are closest to solving the problem and locating the target device, have the lowest FNerror values. In one embodiment, the FNerror values can be normalized between 0 and 1. Evolving a new population of individuals depends on the type of evolutionary algorithm used, such as genetic or artificial immune system algorithms, but the new population includes high fitness individuals from the present generation (best fitting nodes) and new individuals evolved from the high fitness individuals (new nodes). Fitness is evaluated for the new population, another new population evolved, and the process repeated until the fitness meets a desired criteria indicating the highest fitness node is the location of the target device, or until the predetermined number of iterations have been completed at which point the highest fitness node is designated as the most likely location of the target device.

The genetic systems based on genetic algorithms and artificial immune systems based on artificial immune system algorithms differ in their methods of evolving a new population of individuals.

For genetic systems based on genetic algorithms, two or more high fitness individuals (best fitting nodes) from the present generation are selected as parent nodes and new individual nodes (new nodes) evolved from the parent nodes. Typically, two parents are randomly selected (in one example, based on a method which has a bias towards high fitness individuals), crossed-over, and mutated. These two *new* individuals are then added to the child population. This process repeats until the child population is the same size as the main population, whereupon the child population becomes the main population for the next iteration.

In one example, the new individual nodes are nodes at an average position between the parent nodes. In a GA there are two genetic pressures applied to the selected parents to generate offspring. If an individual is an x,y coordinate;

$P1=(x1, y1)$
$P2=(x2, y2)$

Crossover combines portions of each parent into the two children. So, given P1 and P2, crossover might swap the y components between the two parents, generating:

$C1=(x1, y2)$
$C2=(x2, y1)$

Mutation then (possibly) modifies each of these children slightly, e.g.

$C1\_m=(x1+2, y2)$
$C2\_m=(x2-1, y1+3)$

Those skilled in the art will appreciate that there are many variations on how crossover and mutation could occur. Both operations are typically based on predetermined probabilities, e.g., crossover might occur with an 80% probability, whereas mutation might only occur with 5%. The average position between the two parents may be another possible form of crossover. These would then possibly be mutated.

In one embodiment, the new population includes a fraction of the best fitting nodes from the previous generation and a number of new individual nodes. In another embodiment, the new population includes only the new individual nodes.

Depending on how the algorithm is designed, the poorest fitting nodes from a population can be discarded, although some can be retained within the population as desired to maintain diversity and avoid incorrect convergence. The next (child) population can be created as described above, without any poor nodes removed. The population size remains constant because the previous generation is completely lost: for this reason, a fraction of the best fitting nodes from the parent population are usually kept in the child population.

In one example, the genetic algorithm can be expressed as:
Population, pop, size N
While iteration i<Max_it
While next_pop.size<=pop.size
Randomly select 2 parents from pop, typically proportional to each individual's fitness
Perform crossover (combine portions of the "genetic" representation of each parent individual to generate 2 hybrid children) according to some predetermined probability
Perform mutation (mutate random "genetic" bits of information) according to some predetermined probability
Add 2 children to next_pop
Repeat until next pop generated
Repeat until stopping criteria.

For artificial immune systems based on artificial immune system algorithms, high fitness individuals are cloned and mutated to evolve a new population of individuals. One type of an artificial immune system algorithm is based on the clonal selection theory, which employs fitness proportional cloning and inverse proportional mutation, such as implemented in the CLONALG clonal selection algorithm. The combination of cloning proportional to fitness and mutation inversely proportional to fitness allows the artificial immune system algorithm to perform a localized search around current, good solutions. Fitness is also known as affinity for artificial immune systems based on artificial immune system algorithms.

A predetermined number of high fitness individuals are selected for cloning, and are cloned according to their fitness. The better the fitness of the individual, the more clones of that individual are produced. For example, the highest fitness individual can be cloned into five clones, the next highest into three clones, and the next highest into one clone. Those skilled in the art will appreciate that other cloning strategies to determine the number of clones can be used as desired for a particular application.

The clones are mutated, with the degree of mutation inversely proportional to the fitness of the clone. The better the fitness of the clone, the less mutation that is needed to move the clone toward the optimum solution. The distance from the clone to the mutated node depends on the fitness of the clone. In one embodiment, the mutated node is selected a distance away from the clone that is inversely proportional to the fitness of the clone. The fitter the clone, the closer it is to the desired solution, and so the less mutation needed to get to the solution. In another embodiment, the constituent components of the FNerror calculation such as the error from each of the field devices are analyzed and the mutated node is shifted in distance and direction to reduce the FNerror value.

The direction of mutation depends on what information is available for calculation. In one embodiment with only a fitness value available, direction is random. When further information can be discerned, for example, when the signal strengths from each field device are considered individually, the direction of mutation can possibly be influenced further. In one example, mutations can be made to reduce individual component signal strength errors. In another example, a direction can be chosen based on a statistical distribution (e.g., a normal distribution) around an angle which is likely to improve the fitness. This angle can be based on the angle to a field device that currently has the lowest signal strength error (in an attempt to make it fitter), or the angle with the greatest signal strength error (in an attempt to make it fitter). Those skilled in the art will appreciate that a number of variations are possible.

Generally, the overall direction of movement of individuals (clones) is influenced by the process of fitness calculation, clone generation, and mutation. Mutated clones can be generated in a random direction; those who are fitter than the parent will more produce more clones themselves (than the parent and siblings) in the next iteration, and therefore form the center of the next round of searching. Over a number of iterations, the effective center of the search can be considered to move in one or more directions based on the improving fitness of the children.

The fitness values can be calculated for the mutated nodes. The mutated node with the highest fitness value can be stored in a memory or solution set population of individuals, which is different than the main population of individuals used in the cloning.

The individual stored as the current most probable location can only be replaced in subsequent iterations by an individual of higher fitness, but not an individual of lower fitness. In another embodiment, a predetermined number of mutated nodes with the highest fitness values can be stored as the current most probable locations for the target device. For example, the five most probable mutated nodes could be stored. A measure of the grouping closeness in location of the predetermined number of mutated nodes can be calculated to determine how likely it is that the target device is near the group of mutated nodes. The more closely packed the group in 2D space, the more likely the target device is near the group. In one example, the grouping closeness in location can be determined from the sum of the FNerror values for each of the group. FNerror calculates the error in signal strengths based on distances from each field device. Each most probable node could be close together in terms of signal strength, but not in terms of x,y coordinates. In another example, a cluster measurement can be performed based on the 2D distances between the most probable nodes. In yet another example, the center of the most probable nodes (mean average of each coordinate dimension) can be calculated and the sum of distances (or alternatively, the average distance) between each node and this center. The more compact the cluster (i.e., the lower the sum, or lower the average distance), the smaller and more targeted the area in which the device is likely to be located. This assumes that a smaller, more compact area implies a higher likelihood that the target device is in that area. Conversely, a large target area has not managed to narrow the location of the target device down to any specific spot. Angles can also be taken into account. the most probable nodes form more than one cluster. A threshold value can be used to assign most probable nodes to appropriate clusters. More than one cluster would suggest more than one likely location for the target device. These clusters can be ranked on something by the number of nodes in that cluster. The more nodes in a cluster, the more likely the target device is in that area. Those skilled in the art will appreciate that the approach is similar to K-means clustering.

The new population can then be created. A predetermined number of individuals in the population including the mutated nodes can be replaced with randomly generated individuals. The cloned/mutated nodes can be kept separate from the main population or can be integrated with the main population. Replacing a portion of the population with randomly generated individuals performs a global search, looking for new good solution areas over the potential solution space to the problem, as well as helping the artificial immune system algorithm escape local minima In one embodiment, a predetermined number of nodes with the lowest fitness values are replaced with randomly generated individuals. In another embodiment, the fitness values are used as a selection mechanism, with the fitness values being used as weighting factors and the replacement of a given individual determined by probabilistic methods including its weighting factor. For example, selection can be an inverse roulette wheel selection. Roulette wheel selection sums all the fitness values of the individuals to give a total. Dividing each individual's fitness by this total gives the proportion of the total (which can be normalized). Each individual can then be ranked based on this normalized proportion. A random probability can then be generated and used to select an appropriate individual based on the proportion into which the random number fits. This approach biases high fitness nodes. To bias low fitness nodes, each normalized proportion is one minus the proportion calculated above. Those skilled in the art will appreciate that the various strategies can be used for the introduction of cloned cells into the main population as desired for a particular application.

The new population evolved using a genetic system algorithm or an artificial immune system algorithm can be repeatedly evaluated and evolved until termination, when a stopping criterion is met. Exemplary stopping criterion include a predetermined number of iterations, or a predetermined fitness value indicating that a location has been found with expected signal strengths close to the actual signal strengths.

Figure 4:
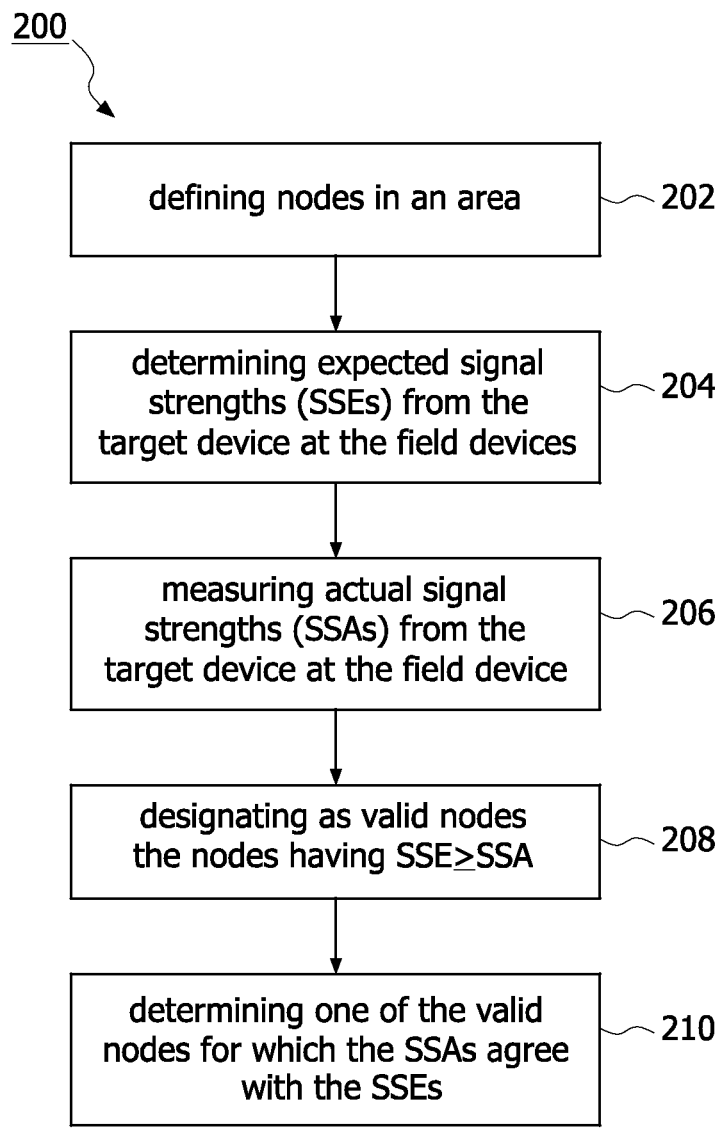
FIG. 4 is a flowchart of another location detection method in accordance with the present invention.

FIG. 4 is a flowchart of another location detection method in accordance with some embodiments of the present invention. In this embodiment, the target node transmits a signal and the field devices detect the signal. The field devices can report the actual signal strengths to an optional control unit for computation.

The method 200 includes defining nodes in an area 202, the area being associated with a target device and field devices; determining expected signal strengths from the target device at the field devices 204, each expected signal strength at a particular field device being associated with one of the nodes; measuring actual signal strengths from the target device at the field device 206 for each of the field devices in communication with the target device, each actual signal strength being associated with one of the field devices; designating as valid nodes the nodes having the expected signal strength for the particular field device that is greater than or equal to the actual signal strength for the particular field device 208; and determining at least one of the valid nodes for which the actual signal strengths for the field devices agree with the expected signal strengths for the field devices at the at least one of the valid nodes 210.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A method for detecting a location of a target device, the method comprising acts of:
providing a plurality of field devices configured to communicate with each other using signals having signal strength, in an area having a plurality of nodes and the target device;
determining an expected signal strength of signals from each of the plurality of field devices at each of the plurality of nodes;
associating each determined expected signal strength at each of the plurality of nodes with one of the plurality of field devices;
for each of the plurality of field devices in communication with the target device:
measuring a first actual signal strength from the field device at the target device;

designating a portion of the nodes as valid nodes; and identifying one of the nodes designated as a valid node at which the measured first actual and the determined expected signal strengths agree as the location of the target device, wherein the portion of the nodes designated as valid nodes are only nodes having the expected signal strength for each of the field devices in communication with the target device being greater than or equal to the actual signal strength measured from the respective field device.

2. The method of claim 1, wherein the determining act uses modeling factors selected from at least one of signal propagation, signal propagation with predicted uncertainty, obstructions, potential obstruction probabilities, and air humidity.

3. The method of claim 1, further comprising an act of detecting when at least one field device is offline, and wherein the act of determining further comprises an act of accounting for the at least one offline field device.

4. The method of claim 1, further comprising acts of:

for each of the field devices in communication with the target device:

measuring a second actual signal strength from the target device to that field device; and determining from a comparison of the first and second actual signal strengths a probability that an object which interferes with signals from the field devices is moving in the area.

5. The method of claim 1, further comprising acts of:

determining an expected location parameter at the nodes;

measuring an actual location parameter at the valid node for which the actual and expected signal strengths agree; and comparing the expected location parameter to the actual location parameter.

6. The method of claim 5, wherein the actual location parameter is selected from at least one of WiFi signal strength, temperature, electrical noise, light level, and sound level.

7. The method of claim 1, further comprising an act of estimating a location of at least one field device from a known position of a fixed field device.

8. The method of claim 1, wherein the identifying act comprises an act of weighting the expected signal strength for a predictable variation in the signal strength.

9. The method of claim 1, wherein the expected signal strength is determined for an initial population of nodes selected at random, and the act of identifying one of the nodes designated as the valid node comprises acts of:

testing fitness of an initial population of nodes of the plurality of nodes;

evolving at least one secondary population of nodes from the initial population of nodes based on the tested fitness of the initial population of nodes;

testing fitness of the at least one secondary population; and identifying the nodes designated as the valid node as the location of the target device based on a criteria selected from one of a predetermined fitness value and a predetermined number of iterations.

10. The method of claim 9, wherein the evolving act uses one of genetic systems and artificial immune systems.

11. The method of claim 1, further comprising an act of receiving via a user interface an input identifying a at least one field device that is offline, and wherein the determining act further comprises an act of determining expected signal strengths accounting for the at least one offline field device.

12. A system for detecting a location of a target device, the system comprising:

a plurality of field devices configured to communicate with each other using signals having signal strength, in an area having a plurality of nodes and the target device; and a processor configured to:

determine an expected signal strength of signals from each of the plurality of field devices at each of the plurality of nodes, each determined expected signal strength at each of the plurality of nodes is associated with one of the plurality of field devices;

for each of the plurality of field devices in communication with the target device:

measure a first actual signal strength from the field device at the target device;

designate a portion of the nodes as valid nodes; and identify one of the nodes designated as a valid node at which the measured first actual and the determined expected signal strengths agree as the location of the target device, wherein the portion of the nodes designated as valid nodes are only nodes having the expected signal strength for each of the field devices in communication with the target device being greater than or equal to the actual signal strength measured from the respective field device.

13. The system of claim 12, wherein the processor is further configured to detect when any of the plurality of field devices is offline, and account for the offline devices to determine the expected signal strength.

14. The system of claim 12, wherein the processor is further configured to:

for each of the field devices in communication with the target device:

measure a second actual signal strength from the target device to that field device; and determine from a comparison of the first and second actual signal strengths a probability that an object which interferes with signals from the field devices is moving in the area.

15. The system of claim 12, further comprising a sensor configured to measure an actual location parameter at the valid node;

wherein the processor is further configured to:

determine an expected location parameter at the nodes, and compare the expected location parameter to the actual location parameter.

16. The system of claim 12, wherein the processor is further configured to estimate a location of at least one field device from a known position of a fixed field device.

17. The system of claim 12, further comprising a location sensor configured to measure an actual node location at the portion of the nodes designated valid, and wherein the processor is further configured to:

determine expected node locations of the portion of the nodes designated valid, and determine node location differences between the expected node locations and the actual node locations.

18. The system of claim 12, wherein the processor is further configured to weight the expected signal strengths for a predictable variation in signal strength.

19. A method for detecting a location of a target device, the method comprising acts of:

providing a plurality of field devices configured to communicate with each other using signals having signal strength, in an area having a plurality of nodes and the target device;

determining an expected signal strength of signals from the target device of the plurality of field devices to each of the plurality of field devices;

associating each determined expected signal strength at each of the plurality of nodes with one of the plurality of field devices;

for each of the plurality of field devices in communication with the target device:

measuring a first actual signal strength from the target device to the field device;

designating a portion of the nodes as valid nodes;

identifying one of the nodes designated as a valid node at which the measured first actual and the determined expected signal strengths agree as first valid nodes;

determining an expected node location of the first valid nodes;

measuring an actual node location of the first valid nodes; and determining node location differences between the expected and actual node locations, wherein the portion of the nodes designated as valid nodes are only nodes having the expected signal strength for each of the field devices in communication with the target device being greater than or equal to the actual signal strength measured from the respective field device.

20. The method of claim 19, further comprising an act of receiving via a user interface an input identifying a at least one field device that is offline, and wherein the determining act further comprises an act of determining expected signal strengths accounting for the at least one offline field device.

* * * * *